(12) United States Patent
Picard

(10) Patent No.: US 10,432,413 B2
(45) Date of Patent: Oct. 1, 2019

(54) AUTOMATIC POWER OVER ETHERNET PULSE WIDTH SIGNALING CORRECTION

(71) Applicant: Texas Instruments Incorporated, Dallas, TX (US)

(72) Inventor: Jean Picard, Hooksett, NH (US)

(73) Assignee: Texas Instruments Incorporated, Dallas, TX (US)

( * ) Notice: Subject to any disclaimer, the term of this patent is extended or adjusted under 35 U.S.C. 154(b) by 210 days.

(21) Appl. No.: 15/594,547

(22) Filed: May 12, 2017

(65) Prior Publication Data

US 2018/0227132 A1 Aug. 9, 2018

Related U.S. Application Data

(60) Provisional application No. 62/455,836, filed on Feb. 7, 2017.

(51) Int. Cl.
*H04L 12/10* (2006.01)
*H05B 33/08* (2006.01)
(Continued)

(52) U.S. Cl.
CPC ................ *H04L 12/10* (2013.01); *H02J 3/02* (2013.01); *H05B 33/089* (2013.01); *H05B 37/0254* (2013.01)

(58) Field of Classification Search
CPC ..... H04L 12/10; H04L 12/12; H04L 12/2818; H04L 12/2825; H04L 12/40039; H04L 12/40045; H04L 12/4625; H04L 41/0833; H04L 43/10; H02J 13/00; H02J 2007/006; H02J 3/02; H02J 9/065; F21S 9/022; F21V 23/02; F21V 23/04; F21Y 2113/00; F21Y 2113/20; F21Y 2115/10; G05F 1/70; G05F 3/02; G06F 1/266; G06F 1/3206; G06F 1/3287; G06F 1/3296; G06F 1/26; G06F 1/32; H05B 33/0842; H05B 37/0218;
(Continued)

(56) References Cited

U.S. PATENT DOCUMENTS 8,441,204 B2  5/2013 Otake et al.
8,868,946 B2  10/2014 Buhari et al.
(Continued)

FOREIGN PATENT DOCUMENTS

EP  2701338 A1  2/2014
WO  2016054120 A1  4/2016

OTHER PUBLICATIONS

Search Report for PCT Application No. PCT PCT/US15153053, dated Dec. 29, 2015 (1 page).
(Continued)

*Primary Examiner* — Alexander H Taningco
*Assistant Examiner* — Renan Luque
(74) *Attorney, Agent, or Firm* — Tuenlap Chan; Charles A. Brill; Frank D. Cimino

(57) ABSTRACT

In a Power over Ethernet (PoE) system, a Powered Device (PD) having circuitry to measure the load current from a Power Sourcing Equipment (PSE) in the PD. Circuitry compares the measured load current with a first threshold. Circuitry automatically generates load pulses for signaling the PSE. The pulse widths of the load pulses are measured and the widths are automatically adjusted, that power to the PD should be maintained.

18 Claims, 4 Drawing Sheets

(51) Int. Cl.
H05B 37/02 (2006.01)
H02J 3/02 (2006.01)

(58) Field of Classification Search
CPC ............ H05B 37/0227; H05B 37/0254; H05B 37/0263; H05B 37/0281; Y02B 20/48; Y02B 70/325; Y02D 10/171; Y02D 10/172; Y02D 50/20; Y02D 50/40; Y02D 50/42; Y04S 20/228; Y10T 307/391; Y10T 307/461; Y10T 307/74
See application file for complete search history.

(56) References Cited

U.S. PATENT DOCUMENTS

| | | |
|---|---|---|
| 8,947,157 B2 | 2/2015 | Levesque et al. |
| 9,152,161 B2 | 10/2015 | Cerutti et al. |
| 2004/0251854 A1 | 12/2004 | Matsuda et al. |
| 2007/0237322 A1 | 10/2007 | Hussain et al. |
| 2009/0206776 A1 | 8/2009 | Inaba |
| 2010/0109561 A1 | 5/2010 | Chen et al. |
| 2010/0123447 A1 | 5/2010 | Vecera et al. |
| 2011/0316449 A1 | 12/2011 | Imanaka |
| 2012/0060042 A1* | 3/2012 | Buhari .................... G06F 1/266 713/320 |
| 2012/0102341 A1 | 4/2012 | Hussain et al. |
| 2012/0104860 A1 | 5/2012 | Feng et al. |
| 2012/0280617 A1 | 11/2012 | Josefowicz et al. |
| 2013/0073874 A1 | 3/2013 | Eghbal |
| 2013/0111245 A1* | 5/2013 | Giat .................... H04L 12/4625 713/323 |
| 2013/0154603 A1* | 6/2013 | Cerutti .................... G05F 3/02 323/312 |
| 2014/0340615 A1 | 11/2014 | Kikuchi et al. |
| 2015/0077009 A1 | 3/2015 | Kunimatsu |
| 2015/0194881 A1 | 7/2015 | Wendt |
| 2015/0303687 A1 | 10/2015 | Yseboodt et al. |
| 2015/0365003 A1 | 12/2015 | Sadwick |
| 2016/0028233 A1 | 1/2016 | Cerutti et al. |
| 2016/0334856 A1* | 11/2016 | Yseboodt ................ G06F 1/266 |
| 2017/0012787 A1* | 1/2017 | Horvath .................. H04L 12/10 |
| 2018/0074567 A1* | 3/2018 | Darshan ............ H04L 12/40045 |

OTHER PUBLICATIONS

Guo et al., "TPS23752 Maintain Power Signature Operation in Sleep Mode," Texas Instruments, Application Report, SLVA588—Apr. 2013, pp. 1-13.
Search Report for PCT/US18/17260, dated Jun. 28, 2018 (1 page).
Search Report for EP15846625.0, date of completion May 18, 2018 (1 page).

* cited by examiner

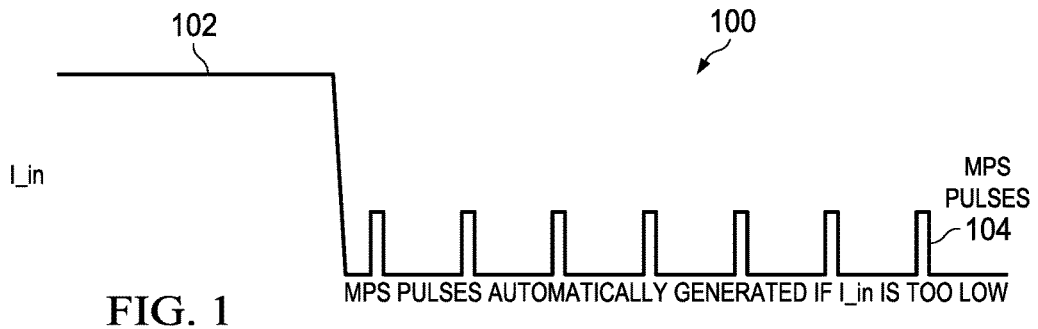
FIG. 1
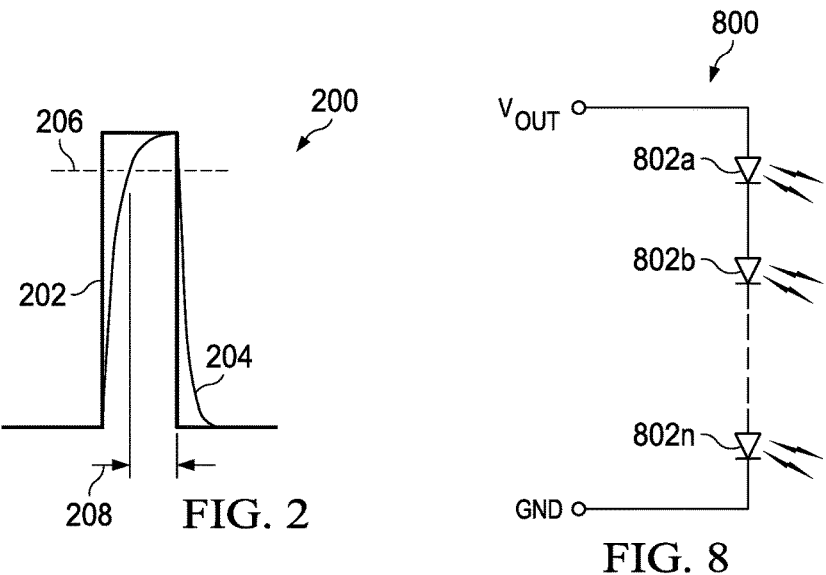
FIG. 2
FIG. 8
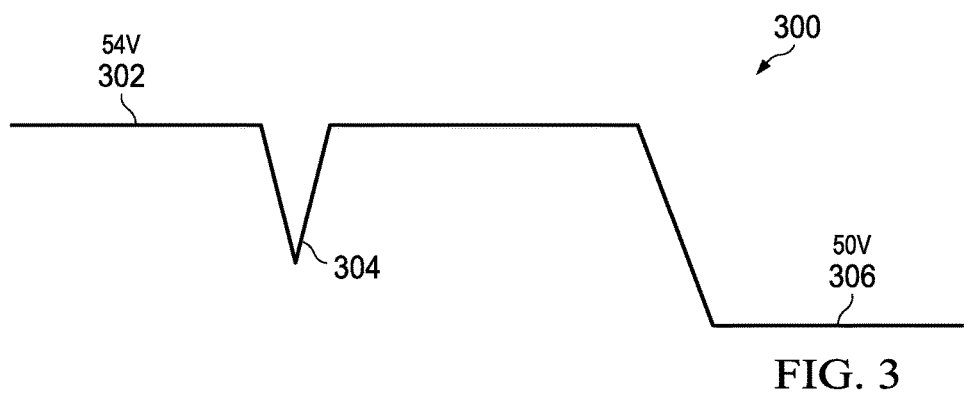
FIG. 3

US 10,432,413 B2

AUTOMATIC POWER OVER ETHERNET PULSE WIDTH SIGNALING CORRECTION

CROSS-REFERENCE TO RELATED APPLICATIONS

This application claims the benefit of U.S. Provisional Patent Application No. 62/455,836, filed Feb. 7, 2017, which is incorporated herein by reference in its entirety and for all purposes.

BACKGROUND

Electronic devices are increasingly used in a greater diversity of applications in which both networking and low power consumption are included. The Power over Ethernet (PoE) system is often provided for certain electronic devices such that electrical power can be passed down Ethernet cabling along with data. Accordingly, a single Ethernet cable, such as category 5 cable or category 6 cable, can provide both a data connection and electrical power to connected devices (such as wireless access points, IP cameras, and IP telephones) without the need to run physically separate power and data cabling. Using the PoE system protocol can save considerable cost when installing a new system or when changes need to be made to an existing system, for example, because the need is reduced for an electrician to install a local AC power point (e.g., when the system is installed) or move the AC power point (e.g., when a device on the network is moved and is no longer close to a power outlet).

To help save power in power-sensitive applications, a Power over Ethernet system can enter a low power mode in which Maintaining Power Signature (MPS) operation is used to signal that a connected device has entered and remains in low power mode. However, the MPS operation itself consumes power while the device is in the low power mode. Accordingly, there is a need to minimize the power consumed by circuitry for MPS operation in low power mode.

SUMMARY

In a Power over Ethernet (PoE) system, a Powered Device (PD) having circuitry to measure the load current from a Power Sourcing Equipment (PSE) in the PD. Circuitry compares the measured load current with a first threshold. Circuitry automatically generates load pulses for signaling the PSE. The pulse widths of the generated load pulses are measured and each width is automatically adjusted, that power to the PD should be maintained.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a waveform diagram of a waveform for the input current to the PD.

FIG. 2 is a waveform diagram of superimposed idealized and realized waveforms of a current pulse of the PD.

FIG. 3 is a waveform diagram of a waveform for the input voltage to the PD.

FIG. 8 is a schematic diagram of an LED load for the PD.

DETAILED DESCRIPTION

Figure 4:
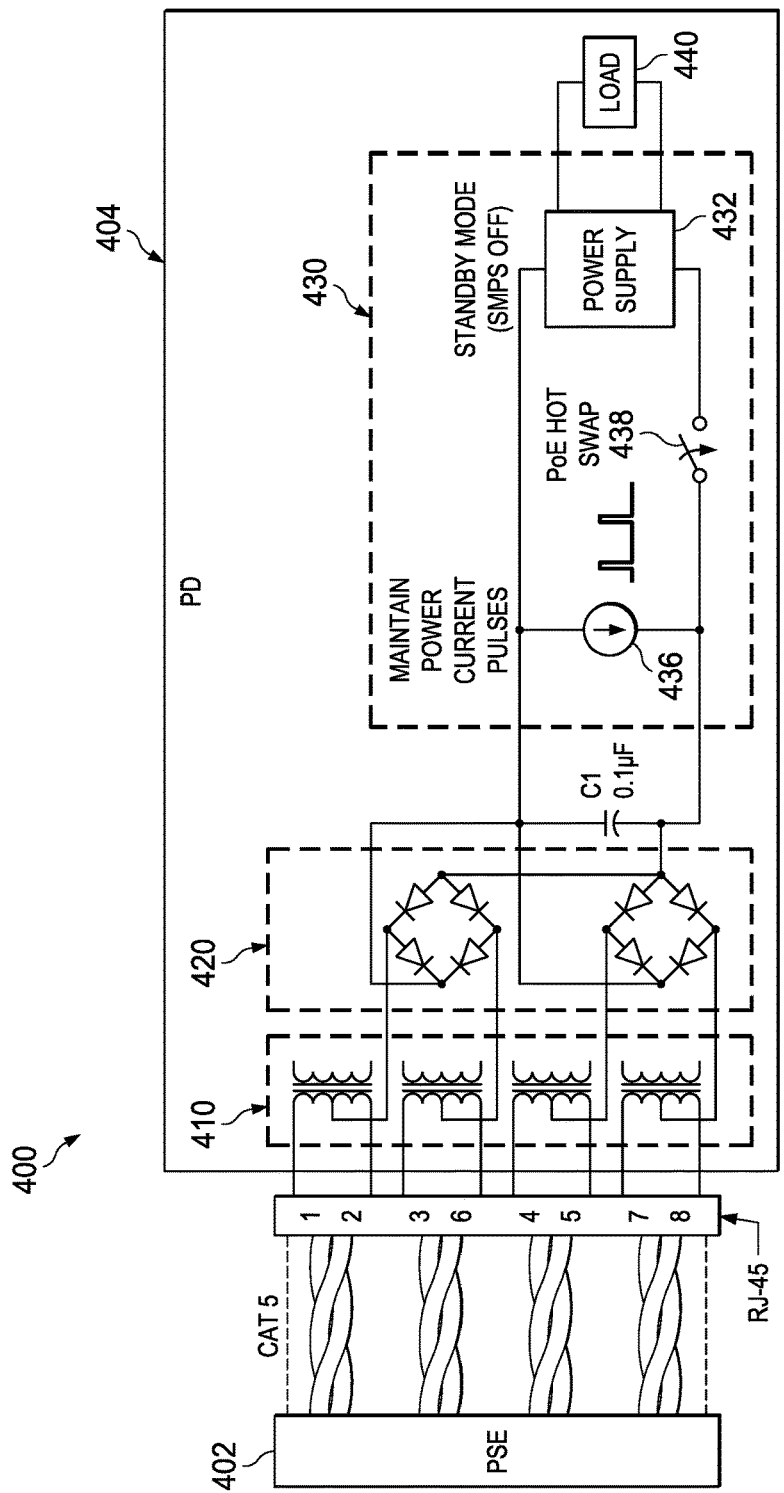
FIG. 4 is a schematic block diagram of an MPS signaling correction system in accordance with example embodiments.

Power over Ethernet (PoE) is a system protocol subject to standards, such as the IEEE standard 802.3 or newer versions, such as the IEEE Std 802.3bt or a proprietary implementation. The higher amounts of power that can be sourced from the PSE (power-sourcing equipment) have led to an increase in diverse kinds of applications in PD (powered devices), which rely on the power supplied by the PSE. The power provided by the PSE is typically required to be always available for many PD applications such as backup power supplies, internet phones, or LED lighting systems. In many cases, some vital functionality must be maintained even when displays and lighting might be turned off in a low power mode (e.g., when relying on the PoE as a power backup supply).

Present IEEE standards require that the power to the PD from the PSE be removed if the PD current consumption falls below a predetermined limit, such as 5 mA or 10 mA. In order to maintain power to the PD, the PD can provide a maintain power signature (MPS) signal, which indicates an electrical signature assuring the PSE that the PD is still requiring power. A valid MPS is characterized by drawing a minimum DC current, such as a constant 10 mA or a 10 mA pulse of at least 75 ms in duration delivered at least once every 325 ms, where the PD has an AC impedance lower than 26.3 KΩ in parallel with 0.05 µF. In addition, future versions of the IEEE standard (such as the new IEEE standard 802.3bt) will likely use similar techniques but with different current level and timing values. For example, newer standards can specify a pulse duration of 7 ms generated every 317 ms.

FIG. 1 is a waveform diagram of a waveform for the input current to the PD, generally as 100. In FIG. 1, when the current I_in 102 drops below the value required to maintain power to the PD, MPS pulses (of a magnitude, duration, and pulse frequency) are automatically generated in accordance with aspects of the present application, as shown at 104.

FIG. 2 is a waveform diagram of superimposed idealized and generated (e.g., realized) waveforms of a current pulse of the PD, generally as 200. In FIG. 2, an example idealized MPS pulse 202 is 75 ms long and includes a current greater than 10 mA. However, the idealized MPS pulse 202 is degraded by resistance and capacitance (such as a "bulk" capacitor, discussed below with reference to FIG. 4), which results in a realized waveform 204, which is generally characterized by rounded rising and falling edges (e.g., associated with exponential decay in response to a step function). For example, the rising edge incurs a capacitively induced delay in achieving the active-high level 206 (while the falling edge slightly trails the active-high level 206 when falling) such that the realized pulse width 208 is shorter than the 75 ms of the idealized MPS pulse 202.

Future (e.g., IEEE) standards (including proprietary implementations) for the PoE systems are expected to be revised to include shorter MPS pulse widths, which saves power. For example, the pulse width 208 of the MPS can be 7 ms and have a pulse repetition rate of 317 ms. When the rising edge includes the incurs a capacitively induced delay in achieving the active-high level 206, the realized pulse width 208 is shorter than the 7 ms of the idealized MPS pulse 202, which leads to the too-short pulse not being detected. When the too-short pulse is not detected, the PSE (e.g., erroneously) removes the PoE even when the PD is attempting to send MPS pulses to maintain the PoE during a too-short pulse mode.

When the PoE for powering the PD is removed erroneously, various faults can occur. For example, power can be removed from the PD. Various effects of such removal of power can cause LED lighting systems to turn on and off, cause IP phones to not accept phone calls, cause IP cameras to not transmit video, cause sensors to halt monitoring, and the like.

FIG. 3 is a waveform diagram of a waveform for the input voltage to the PD, generally as 300. Presently applicable IEEE standards for the PoE system protocol permit PSE to introduce voltage steps (up to 6V) voltage provided to the PD over Ethernet cabling. For example, such a voltage change can be a short-duration "glitch" 304 (where the voltage is returned to a nominal level) or a "new" operating voltage level, as shown at 306.

The voltage developed across the PD bulk capacitor voltage impedes any instantaneous voltage change, such that the MPS current is impeded from circulation through the PoE-enabled cable. The current supplied by the PD bulk capacitor also shortens the pulse width of the MPS current in a manner similar to the shortening of MPS pulse widths as discussed above with reference to FIG. 2. In various aspects, the shortened pulse width is automatically corrected (e.g., "stretched") by the circuits, systems, and methods in accordance with the MPS signaling correction system 400 described below. The MPS pulse widths are stretched, for example, to a length long enough to ensure valid detection by the PSE, but short enough so as to not consume unnecessary amounts of power.

FIG. 4 is a schematic block diagram of an MPS signaling correction system in accordance with example embodiments. FIG. 4 shows an MPS signaling correction system, generally as 400. POE input power flows from the PSE 402 through the PD 404 front end. The PD 404 front end includes center-tapped transformers 410, and a diode bridge circuit 420. The center-tapped transformers 410 are for coupling power from the Ethernet cable to the diode bridge circuit 420. The diode bridge circuit 420 provides polarity protection and is for coupling the input power to circuits of the PD 404, including the power control circuit 430.

The high side terminal of the diode bridge circuit 420 is coupled to circuitry of the power control circuit such as input load capacitor C1 (e.g., a 0.1 µF capacitor provided in accordance with PoE specifications for AC loading), to the bulk capacitor C2 (e.g., a relatively large 100 µF capacitor provided for storing a charge initially sourced from the PSE), and to a power input of the power supply 432.

The power supply 432 can be switching mode power supply arranged to provide power to the load 440 during normal PoE operation, and is arranged to be off or lightly loaded during a standby mode. (For example, the display and/or lights of an IP phone can be turned off to save power when not in use.) The $V_{DD}$ provides power to the power supply 432 as well as to the MPS pulse generator 436 for generating the MPS current pulse, for example. The output of power supply 432 is regulated for sourcing regulated power to a load 440 (e.g., which consumes power while providing PD 404 functionality). The $V_{DD}$ is coupled to an MPS pulse generator 436 for generating the MPS current pulse, for example. As described further below, the voltage $V_{DD}$ is coupled to the MPS pulse-width auto-correction circuit 550 for purposes of correcting MPS pulses, for example.

The low side terminal of the diode bridge circuit 420 provides a return path to the PSE of current used by the PD. The PoE hot-swap switch 438 (e.g., Q1 described below with respect to FIG. 5) limits current provided to the power supply as well as charges (with an inrush limit) the bulk capacitor C2. Once the input voltage has been increased to the operating voltage, the power supply 432 is turned on. If the load current is less than required, in order to maintain power to the PD 404 from the PSE 402, the timing logic circuit 556 generates control signals supplied to the TMPS (timed MPS) auto-stretch circuit 560 for generating a proper sequence of power current pulses of correct width to be superimposed over any current present in the input line from the PSE 402. For example, the amplitude of the current pulse is determined in response to (e.g., equal to) a difference between the total load current on the PD and the minimum current required by a standard.

As described below with respect to FIG. 5, the MPS pulse-width auto-correction circuit 550 generates each current pulse of a sequence of MPS pulses in response to an amount of current consumed by the PD 404, for example, and ensures that the magnitude of each current pulse is maintained ("stretched") at a proper active high level such that each generated pulse is of a correct duration at a valid active high level. A sequence of MPS pulses is typically generated until an event occurs indicating a return to normal power occurs. The sequence of MPS pulses helps ensure the PSE 402 provides power to the PD 404 for maintaining a selected level of functionality during the low power mode.

In an embodiment, the PD 404 is coupled to more than one potential source of power such as two or more of a backup power supply, a first PSE, 402 and a second PSE 402. For example, the PD 404 is arranged to determine which sources of power can provide operating power (e.g., for use in a low power mode) and to select a source of power to be used in accordance with a priority policy (e.g., select the first PSE first if power is present there, and if not then select the second PSE second if power is present there, and if not then select the backup power supply if power is present there). When operating in a low power mode with power provided by a selected PSE, the PD 404 sends MPS pulses (having a correct pulse width by operation of the MPS pulse-width auto-correction circuit 550) to the selected PSE to maintain power during the low power mode.

Figure 5:
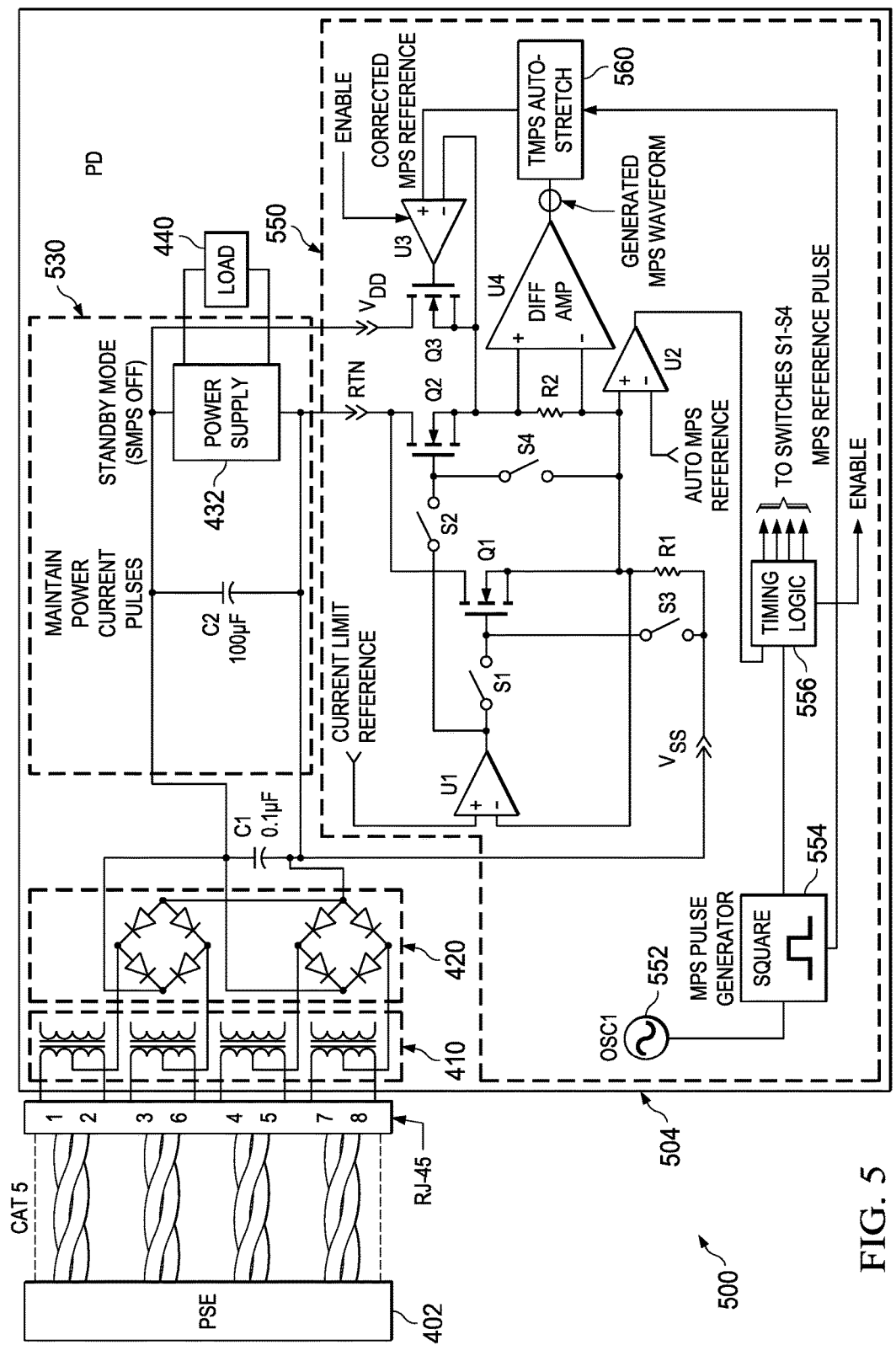
FIG. 5 is a schematic diagram of an MPS signaling correction system in accordance with example embodiments.

FIG. 5 is a schematic diagram of an MPS signaling correction system in accordance with example embodiments. FIG. 5 shows an MPS signaling correction system, generally as 500, which shows components of the MPS pulse-width auto-correction circuit 550. The MPS pulse-width auto-correction circuit 550 includes a timing logic circuit 556 for controlling switches S1, S2, S3, and S4 in accordance with a power mode. In normal operation switches S1 and S4 are closed and switches S3 and S2 are open, while in low power operation switches S2 and S3 are closed and switches S1 and S4 are open (such that the current limiting action of error amplifier U1 is active during both modes of operation, even during low power operation).

A transistor Q1 is coupled between the return line RTN and a first terminal of resistor R1, where the second terminal of R1 is coupled to $V_{SS}$. In normal operation, the switch S1 couples the gate of transistor Q1 to an output of error amplifier U1. The error amplifier U1 includes a non-inverting terminal coupled to a current limit reference signal and an inverting input coupled to the node between transistor Q1 and resistor R1. The error amplifier U1 measures the voltage across resistor R1 to determine if the current exceeds a maximum current limit and to regulate the current to that maximum limit. (For example, the voltage across resistor R1 is developed in response to the current flowing through the signal line RTN, and the maximum current limit is indicated by the current limit reference signal.)

A transistor Q2 is coupled between the signal line RTN and a first terminal of resistor R2, where the second terminal of R2 is coupled to the node between transistor Q1 and resistor R1 and the non-inverting input of comparator U2, where the inverting input of U2 is coupled to the signal line $V_{SS}$. In normal operation, the switch S4 couples the gate of transistor Q2 to the first terminal of resistor R1. A transistor Q3 is coupled between the voltage $V_{DD}$ and a node between transistor Q2 and the first terminal of resistor R2. The gate of transistor Q3 is coupled to receive an output of error amplifier U3, which includes a non-inverting input coupled to receive the output of the TMPS auto-stretch circuit 560 and an inverting input coupled to the node between transistor Q2 and resistor R2. In low power operation, the switch S2 couples the output of the error amplifier U1 to the gate of transistor Q2.

An output of comparator U2 is coupled to the timing logic circuit 556, which includes outputs for individually actuating each of the switches S1 through S4. (The timing logic circuit also optionally includes an enable output coupled to an enable input of error amplifier U3 for conserving power during normal operation.) An oscillator OSC1 552 generates a signal, which is converted to pulses by MPS pulse generator 554, such that the pulses are applied to timing logic circuit 556. In response to the applied pulses (e.g., clock), the timing logic circuit 556 generates the control signals for switches S1-S4 and for the pulses generated by TMPS auto-stretch circuit 560, error amplifier U3, and transistor Q3 during low power operation.

In normal operation, switch S4 is normally closed to maintain transistor Q2 off and switch S1 is closed such that U1 controls the current through Q1. Switches S2 and S3 are open at this time (e.g., to deactivate Q2 and to not deactivate Q1). Accordingly, all the current sourced from the load returns to the RTN node and passes through transistor Q1 and resistor R1 (e.g., across which is developed a voltage proportional to the passed current).

The voltage across resistor R1 is used to indicate a measured amount of current passing through the load and is coupled to the inverting input of error amplifier U1. The current limit reference signal is applied to the non-inverting input of error amplifier U1 such that the error amplifier U1 determines whether an over-current condition exists. Accordingly the current measurement indicates whether to limit the current, should the current exceed a predetermined threshold. For example, as the voltage across resistor R1 exceeds the current limit reference signal, the output voltage of U1 decreases, which decreases the gain of Q1, which in turn decreases the amount of current flowing through Q1.

Also in normal operation, the voltage developed across the resistor R1 is also compared against the Auto MPS Reference applied to the inverting input of comparator U2, the output of which is utilized to control the timing logic-driven control switches S1-S4. When the current through resistor R1 falls below a predetermined threshold, the low power mode is entered and the switches S1 and S4 are opened and the switches S2 and S3 are closed by signals generated by the timing logic circuit 556. This turns off transistor Q1 (which is a larger FET for carrying high currents) and turns on transistor Q2 (which is a smaller FET for carrying relatively small currents, where the smaller FET Q2 achieves higher measurement accuracies than those possible when using Q1). Accordingly, the current returning from the PD load passes through the RTN node, passes through transistor Q2, passes through resistor R2 and then passes through resistor R1 to $V_{SS}$ during low power operation.

In order to minimize power dissipation in normal operation, the value of resistor R1 value is selected to be as low as possible. However, at low currents, the low value of resistor R1 results in relatively large errors when U2 is used to compare the load current to a threshold (Auto MPS Reference) due to any offset voltage of comparator U2. For example, assuming a value of 25 mΩ for R1, a 1 mV offset in the comparator U2 can create a measurement error of 40 mA. Given the fact that the normal current needed to maintain power from the PSE to the PD is quite low (typically only about 10-15 mA), this can be a substantial error resulting in otherwise unnecessary power consumption.

When entering the low power mode in response to the determination the current is too low to maintain power from the PSE 402 to the PD 404, a second resistor R2 is switched into the circuit (e.g., by activating Q2 when entering the low power mode). The value for resistor R2 can be a resistance of at least an order of magnitude higher than resistor R1 and can be as low as 5Ω, for example. A combined sense resistor (e.g., formed by resistor R2 and resistor R1 in series) is used by U3 to accurately measure the current in low power mode and to generate any needed MPS current (e.g., in pulses) to maintain the PoE from the PSE 402. The TMPS auto-stretch circuit 560 determines the initiation and duration of an MPS pulse (e.g., by generating the corrected MPS reference signal), while the combined sense resistor develops a voltage for controlling the amount of additional current to be provided by the pulse-generating transistor Q3.

The relatively much larger resistance of the combined sense resistor allows U3 (e.g., for a given voltage offset) to much more accurately control the MPS current, and generating an additional current when needed (as more accurately determined). For example, a 1 mV offset in the amplifier U3 error would result in an error of (only) around 200 µA. Accordingly, MPS pulse-width auto-correction circuit 550 permits the utilization of a low resistance shunt during normal operation to minimize the power loss in the shunt resistor, and then couples a higher resistance in series with the current return path to the PSE 402 for generating more accurate current pulses in low power operation for maintaining the power flow from the PSE 402 to the PD 404, where the use of the more accurate current pulses saves power.

If MPS pulses are needed (e.g., when the PD 404 is not consuming enough power for maintaining PoE power from the PSE 402 during normal operation), the timing logic circuit 556 enables the enable input of error amplifier U3 to generate an output voltage for controlling transistor Q3 at the top of the resistor chain comprising R2 and R1 in series. The error amplifier U3 determines the amount of additional current to be superimposed onto the RTN line such that the MPS pulses, having current drawn from $V_{DD}$, meet or exceed the given requirements for the MPS pulsing (e.g., such that the PSE will continue to provide power to the PD). Accordingly, each generated MPS pulse includes the load current already flowing through R1 and R2 as well as the minimized additional current added by U3 for ensuring the MPS requirement is produced.

As discussed above, the generated MPS pulses are subject to degradation due to the relatively large capacitance of the bulk capacitor C2 and due to voltage changes to the PoE (e.g., such that the bulk capacitor supplies a current not instantaneously supplied by the PSE 402 when impeding any PoE voltage changes). Accordingly, the MPS pulse width (if not corrected by the TMPS auto-stretch circuit 560, for example) would otherwise have to be made longer so as ensure meeting MPS requirements for maintenance of PoE from the PSE 402 to accommodate for such voltage changes. The lengthened pulses would consume more power overall: however, the consumption of the such extra power is obviated by the TMPS auto-stretch circuit 560, which measures the length of the one or more pulses generated by the MPS pulse generator 554, monitors the pulse width of the actual generated pulses, and corrects the pulse width of each of the actual generated pulses in response to a corrected MPS reference pulse such that the generated pulse is (e.g., always) of the correct width (e.g., duration in time as displayed on an x-axis).

The MPS pulse-width auto-correction circuit 550 is arranged to determine when the generated MPS pulse reaches a level sufficient to meet MPS requirements for an active-high level and maintains the level of the generated MPS pulse at (or above) the active-high level in accordance with a valid pulse width (such as a pulse width of a pulse generated by MPS pulse generator 554). The differential amplifier U4 amplifies the voltage across resistor R2 to generate an MPS waveform replica (e.g., which is a scaled replica of the actual MPS pulse because current from both Q2 and Q3 passes through R2) for determining when the generated MPS pulse reaches the active-high level. The MPS pulse-width auto-correction circuit 550 receives the MPS waveform replica to determine when the generated MPS reaches the active-high level and receives a clock signal generated by MPS pulse generator 554 to determine (at least) how long to maintain (e.g., sustain at or above the active-high level) a generated MPS pulse.

Figure 6:
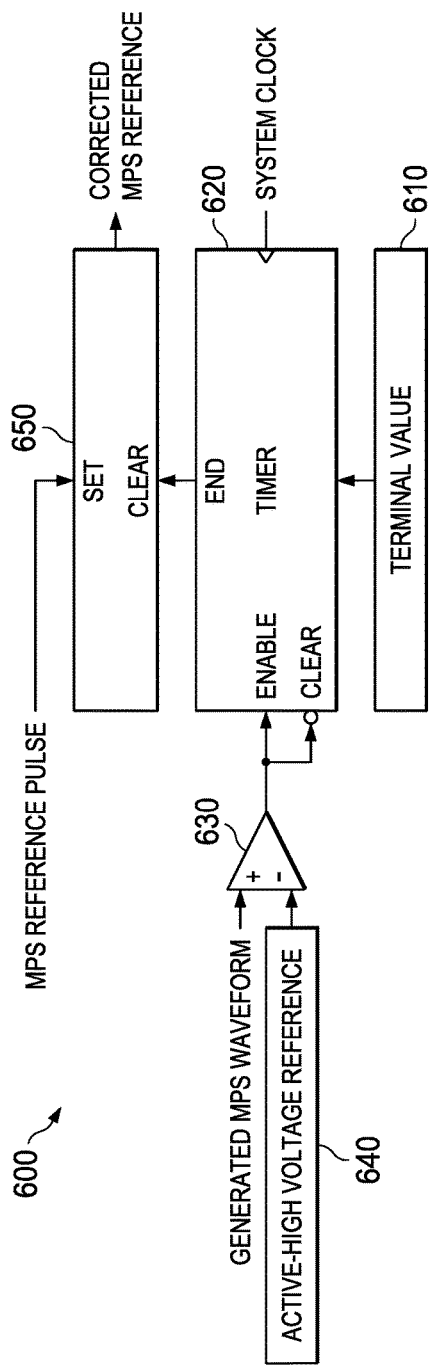
FIG. 6 is a schematic diagram of a TMPS auto-stretch circuit in accordance with example embodiments.

FIG. 6 is a schematic diagram of a TMPS auto-stretch circuit in accordance with example embodiments. The TMPS auto-stretch circuit 600 (shown generally) is an example of the TMPS auto-stretch circuit 560 described above. The TMPS auto-stretch circuit 600 is arranged to receive an initial indication to generate an MPS pulse, to initiate the generation of the MPS pulse in response to the initial indication, to receive a current measurement of the MPS pulse being generated, to determine when a rising edge of the MPS pulse being generated rises above an active level, and to maintain the generation of the MPS pulse until a predetermined period of time has elapsed (e.g., from the time of the MPS pulse rising above the active level). When the predetermined period of time has elapsed, the TMPS auto-stretch circuit 600 is arranged to terminate the generation of the MPS pulse, e.g., such that the generated MPS pulse includes a pulse width of a predetermined width, which compensates for (e.g., bulk capacitor-induced) capacitive degradation of the rise time of the MPS pulse.

For example, the auto-stretch circuit 600 includes a terminal value 610 register, a (e.g., programmable) timer 620, a comparator 630, an active-high voltage reference 640, and a latch 650. The latch 650 remains cleared until an initial indication to generate an MPS pulse is received (e.g., received via the MPS Reference Pulse signal), which sets the latch 650 (for asserting the Corrected MPS Reference signal), which in turn initiates the generation of the MPS. The generation of the MPS pulse is initiated by activating transistor Q3 such that additional current by the PD is drawn (e.g., for the purpose of generating an MPS pulse). As discussed above, the bulk capacitor C2 capacitively degrades the rise time of the MPS pulse being generated.

The timer 620 is a digital circuit responsive to an Enable/Clear-signal from the comparator 630. The comparator 630 is arranged to assert the Clear signal until the comparator 630 determines the MPS pulse being generated has reached an active-high level (e.g., active-high level 206). The comparator 630 determines MPS pulse being generated has reached the active-high level by comparing a fixed active-high voltage reference 640 received at an inverting input with a generated MPS waveform replica received from U4 at a non-inverting input. The voltage of the active-high voltage reference 640 (as compared to the active-high level 206) can be determined in accordance with the gain of differential amplifier U4 and in accordance with a signal (e.g. developed across R2) proportional to a PD load current generated by transistor Q3 (and optionally including a PD load current flowing through transistor Q2).

When the MPS pulse being generated is determined to have reached the active-high level, the comparator 630 is arranged to assert the Enable signal, such that the timer 620 starts counting clock cycles of the system clock. For example, the timer 620 starts counting (from an initial cleared value of zero) by incrementing a timer count value for each system clock cycle encountered.

While the timer 620 is counting (e.g., before the timer reaches a terminal count), the MPS pulse is maintained in response to one or more measurements of the generated MPS pulse. The measurement of the generated MPS pulse (or waveform replica) forms part of a feedback control loop in which the generated MPS pulse is measured by circuitry for controlling the generation and maintenance of the MPS pulse. A first such measurement is the comparison of the MPS waveform replica to the active-high voltage reference 640 (e.g., when the MPS waveform replica is greater than or equal to the active-high voltage reference 640, the comparison result prevents the timer 620 from being cleared before the terminal count is reached, which would otherwise terminate the assertion of the Corrected MPS Reference signal). A second such measurement is the comparison of the feedback loop (coupled to the inverting input of U3) to the Corrected MPS Reference signal (e.g., where the comparison automatically adjusts the gain of Q3 during the assertion of the MPS pulse, where the gain is adjusted for maintaining the generated MPS pulse at or above the active-level 206).

The timer 620 continues counting until the timer count value reaches a value indicated by the terminal value 610. When the timer 620 timer count value reaches a (e.g., predetermined) terminal count value, the timer 620 is arranged to generate an End signal. In response the assertion of the End signal, the latch 650 is arranged to clear, which terminates the assertion of the Correct MPS Reference signal, which in turn deactivates transistor Q3 such that no additional current by the PD is drawn (e.g., for the purpose of generating an MPS pulse) and the generation of the MPS pulse is terminated. Accordingly, the generated MPS pulse includes a pulse width of a predetermined width (e.g., where the pulse width is determined in response to the terminal value 610 and the system clock frequency).

The timer 206 count value resets automatically in response to the Clear signal, however the terminal value 610 typically persists (e.g., is not cleared in response to the Clear signal). The time 206 can be pre-programmed with a terminal value 610 determined in response to a system clock frequency (e.g., where the MPS reference pulses are clock pulses having a frequency suitable for producing an accurate time base for generating a specified MPS pulse width). The terminal value 610 can be predetermined in accordance with a standard (including any proprietary implementation) determined and/or selected for a PoE system (e.g., during design or after deployment).

Figure 7:
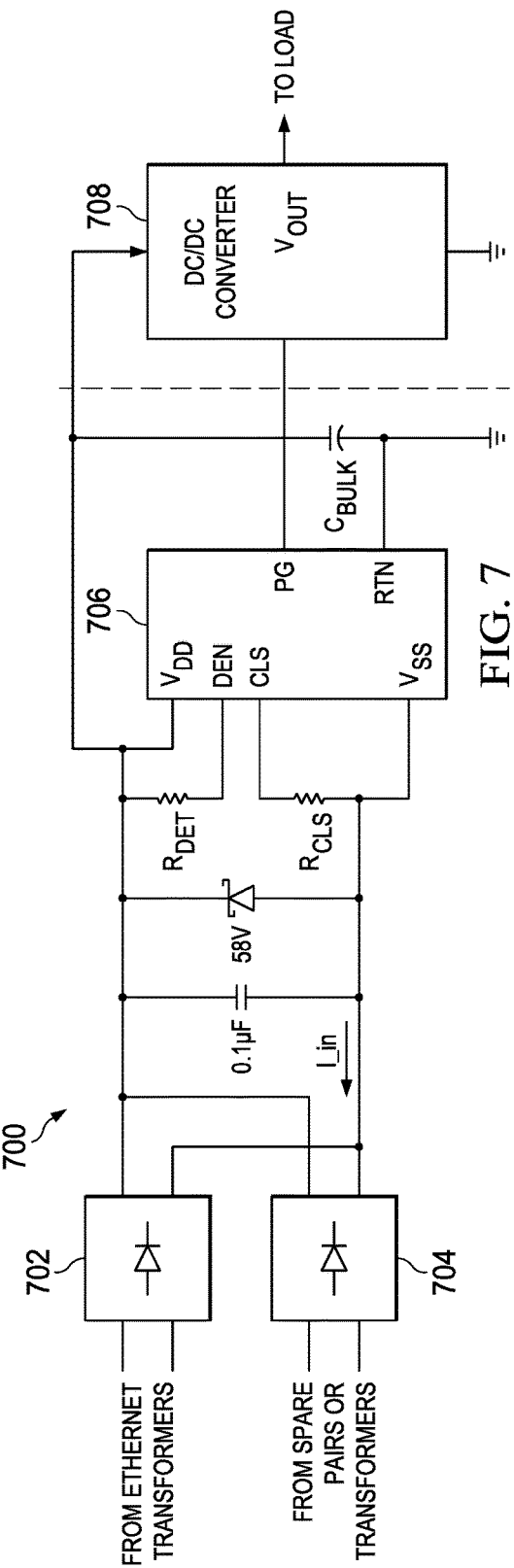
FIG. 7 is a schematic block diagram of a system within a PD.

FIG. 7 is a schematic block diagram of a system within a PD, shown generally as 700. In FIG. 7, block 706 includes circuitry, which is shown in greater detail in FIG. 4 and/or FIG. 5. The PD receives power from the PSE along two or four pairs of the four pairs of wires within the Ethernet cable, here labeled 702 and 704. A capacitor and a Zener diode protects against voltage spikes. At startup, the PSE looks for the resistor $R_{DET}$ which is utilized to determine if a valid resistance, defined by the IEEE standard, is detected, which indicates that the PD is requesting power from the PSE. The PSE then increases voltage and determines the amount of current drawn through the resistor $R_{CLS}$, which determines how much power, is to be provided as defined by the IEEE standard. Once the input voltage has been increased to the operating voltage, the hot swap switch (e.g., Q1) is turned on. Then, the current is allowed up to its full current limit. A "power good" signal is provided at the terminal PG, after which the DC-to-DC converter 708 is turned on. The DC-to-DC converter 708, shown in FIG. 7, might not be part of the PD interface circuit, but is utilized to provide a controlled voltage to a load. The load can be LED lighting, for example, as discussed below. The capacitor $C_{BULK}$ is utilized by the DC-to-DC converter during startup and to keep the voltage $V_{DD}$ input to the converter stable.

FIG. 8 shows one type of load for the DC-to-DC converter (such as DC-to-DC converter 708 in FIG. 7) generally as 800. As shown in FIG. 8, the load includes a plurality of LEDs, such as 802*a*, 802*b* - - - 802*n*, which can be connected from the Vout terminal of the converter to ground, for example. The number of LEDs in the string is a design choice. The LEDs can provide general room lighting, for example, and not just indicate that power is applied to a device, such as the PD itself. Other circuits, which can provide additional functionality, such as determining the occupancy of an area by way of a motion detector, for example, can also be connected as part of the load.

Although the invention has been described in detail, it should be understood that various changes, substitutions and alterations can be made thereto without departing from the spirit and scope of the invention as defined by the appended claims.

What is claimed is:

1. A circuit, comprising:
   a first comparator for measuring a load current in a powered device (PD) and for comparing the load current to a reference and generating an output signal;
   a timing logic circuit responsive to the output signal for generating an enable signal;
   a pulse generator responsive to the enable signal to generate a current pulse having an amplitude determined in response to a difference between a total load current on the PD and a minimum current required by a standard when coupled to a Power Sourcing Equipment (PSE) to automatically signal the PSE to maintain power supplied to the PD; and
   a correction circuit for measuring the amplitude of the generated current pulse to determine when the measured amplitude exceeds an active level and for generating a corrected reference signal for maintaining the measured pulse at a current level above the active level for a predetermined period of time for signaling the PSE to maintain power to the PD.

2. The circuit of claim 1, wherein the first comparator is arranged to measure the load current responsive to a first voltage drop across a first resistor, and wherein the pulse generator is arranged to couple the generated current pulse through a second resistor for developing a second voltage drop.

3. The circuit of claim 2, wherein the first resistor is a low valued shunt and the second resistor has a resistance of at least an order of a magnitude higher than the first resistor.

4. The circuit of claim 2, wherein the correction circuit is arranged to measure the amplitude of the generated current pulse responsive to the second voltage drop.

5. The circuit of claim 2, wherein the generated current pulse is coupled through the first resistor.

6. The circuit of claim 2, comprising an error amplifier for controlling the amplitude of the generated current pulse responsive to the second voltage drop and responsive to the correction reference signal.

7. The circuit of claim 2, comprising a differential amplifier for generating a waveform responsive to the second voltage drop, wherein the correction circuit is arranged to measure the amplitude of the generated current by comparing the generated waveform with a fixed voltage reference.

8. The circuit of claim 7, comprising a second comparator for comparing the generated waveform to the voltage reference to determine when the measured amplitude of the generated current pulse exceeds the active level.

9. The circuit of claim 8, comprising a timer for determining when to terminate the generation of the generated current pulse.

10. The circuit of claim 9, wherein the generation of the generated current pulse is terminated responsive to the determination when the measured amplitude of the generated current pulse exceeds the active level.

11. A PD including the circuit of claim 1.

12. The circuit of claim 1, wherein the standard is a Power over Ethernet (PoE) standard.

13. An interface, comprising;
   a pulse generator for generating a current pulse having an amplitude determined in response to a difference between a total load current on a powered device (PD) and the minimum current required by a standard from the PD coupled to a Power Sourcing Equipment (PSE) to automatically signal the PSE to provide power to the PD;
   a pulse corrector for determining when the generated current pulse reaches an active level for indicating that power to the PD from the PSE is to be maintained and for generating a corrected reference signal for maintaining the generated current pulse at a current above the active level for a predetermined period of time for indicating that power to the PD is to be maintained; and
   an error amplifier for controlling the amplitude of the generated current pulse responsive to the corrected reference signal and responsive to a PD load current measurement.

14. The interface of claim 13, wherein the error amplifier is arranged to control the amplitude of the generated current pulse responsive to a waveform generated responsive to the generated current pulse.

15. A PD including the interface of claim 13, wherein the interface is arranged to provide power over Ethernet for one or more circuitry for backup power, LED lighting, IP (Internet protocol) phones, cameras, and wireless access points.

16. A method, comprising:
   generating a current pulse having an amplitude determined in response to a difference between a total load current on a powered device (PD) and the minimum current required by a standard from a PD coupled to a Power Sourcing Equipment (PSE) to automatically signal the PSE to provide power to the PD;
   determining when the generated current pulse reaches an active level for indicating that power to the PD from the PSE is to be maintained;
   responsive to a PD load current measurement, maintaining the generated current pulse at a current level above the active level for a predetermined period of time for indicating that power to the PD is to be maintained; and
   controlling the amplitude of the generated current pulse responsive to a correction reference signal generated in response to the determination of when the generated current pulse reaches the active level.

17. The method of claim 16, comprising controlling control the amplitude of the generated current pulse responsive to a waveform generated responsive to the generated current pulse.

18. The method of claim 16, wherein the generated current pulses are MPS (maintain power signature) pulses having a predetermined duration and spacing.

* * * * *